United States Patent
Schlechte et al.

(10) Patent No.: US 10,683,441 B2
(45) Date of Patent: Jun. 16, 2020

(54) COMPOSITION INCLUDING EPOXY ADHESIVE AND ALUMINUM FLAKES AND METHOD FOR USING THE SAME

(71) Applicant: 3M INNOVATIVE PROPERTIES COMPANY, St. Paul, MN (US)

(72) Inventors: Jay S. Schlechte, Oakdale, MN (US); Peyton R. Nosbusch, East Bethel, MN (US); George M. Stout, Maplewood, MN (US); Michael A. Kropp, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 272 days.

(21) Appl. No.: 15/448,277

(22) Filed: Mar. 2, 2017

(65) Prior Publication Data

US 2017/0253779 A1 Sep. 7, 2017

Related U.S. Application Data

(60) Provisional application No. 62/302,720, filed on Mar. 2, 2016.

(51) Int. Cl.
```
B32B 27/38      (2006.01)
B32B 27/26      (2006.01)
B32B 27/20      (2006.01)
B32B 27/18      (2006.01)
C09J 163/04     (2006.01)
C09J 163/00     (2006.01)
C08G 59/50      (2006.01)
C08G 59/32      (2006.01)
C08G 59/24      (2006.01)
C08K 9/04       (2006.01)
C08K 7/00       (2006.01)
C08K 3/08       (2006.01)
F16B 11/00      (2006.01)
B32B 7/12       (2006.01)
B32B 37/12      (2006.01)
C09J 5/00       (2006.01)
C09J 11/04      (2006.01)
C09J 11/08      (2006.01)
B32B 15/092     (2006.01)
```

(52) U.S. Cl.
CPC .............. *C09J 163/00* (2013.01); *B32B 7/12* (2013.01); *B32B 37/12* (2013.01); *C08G 59/50* (2013.01); *C09J 5/00* (2013.01); *C09J 11/04* (2013.01); *C09J 11/08* (2013.01); *F16B 11/006* (2013.01); *B32B 2037/1253* (2013.01); *B32B 2037/1269* (2013.01); *B32B 2250/02* (2013.01); *B32B 2255/26* (2013.01); *B32B 2305/30* (2013.01); *B32B 2305/72* (2013.01); *B32B 2307/748* (2013.01); *B32B 2311/24* (2013.01); *B32B 2363/00* (2013.01); *B32B 2605/00* (2013.01); *C09J 2451/00* (2013.01); *C09J 2463/00* (2013.01)

(58) Field of Classification Search
None
See application file for complete search history.

(56) References Cited

U.S. PATENT DOCUMENTS

| | | | |
|---|---|---|---|
| 3,181,962 A | | 5/1965 | Rolles |
| 3,234,038 A | | 2/1966 | Stephens |
| 3,280,215 A | * | 10/1966 | Severance ............... C08L 45/02 528/116 |
| 3,389,105 A | | 6/1968 | Bolger |
| 3,496,250 A | | 2/1970 | Czerwinski |
| 4,138,270 A | | 2/1979 | Ishijima |
| 4,213,886 A | | 7/1980 | Turner |
| 4,236,934 A | | 12/1980 | Bell |
| 4,292,087 A | | 9/1981 | Bell |
| 4,451,591 A | * | 5/1984 | Kozak ................... C09D 5/103 523/177 |
| 4,486,225 A | | 12/1984 | Osborn |
| 4,522,655 A | | 6/1985 | Claassen |
| 4,524,181 A | | 6/1985 | Adam |

(Continued)

FOREIGN PATENT DOCUMENTS

| | | |
|---|---|---|
| CN | 101760160 | 6/2010 |
| EP | 0015725 | 9/1980 |

(Continued)

OTHER PUBLICATIONS

International Search Report for PCT/US2017/020419, dated Apr. 13, 2017, 4 pages.

(Continued)

*Primary Examiner* — Michael J Feely

(57) ABSTRACT

A curable adhesive composition includes a curable epoxy resin, an amine curing agent, a toughening agent, and aluminum flakes. The aluminum flakes include a fatty acid milling aid on at least a portion of their surfaces. The aluminum flakes were heated after milling. An article includes an adhesive composition cured between at least two members. The cured adhesive composition includes the heat-treated aluminum flakes within a toughened epoxy resin cured with an amine curing agent. The method includes applying the curable adhesive composition of described above to a surface of at least one of two or more members, joining the members so that the curable adhesive composition is sandwiched between the two or more members, and curing the curable adhesive composition to form an adhesive bond between the two or more members.

20 Claims, No Drawings

(56) References Cited

U.S. PATENT DOCUMENTS

| | | | |
|---|---|---|---|
| 4,846,905 A | 7/1989 | Tarbutton | |
| 4,920,002 A | 4/1990 | Cussot | |
| 5,180,792 A | 1/1993 | Takada et al. | |
| 6,045,873 A * | 4/2000 | Adachi | C08G 59/4042 427/410 |
| 6,207,226 B1 * | 3/2001 | Igarashi | B05D 5/068 106/404 |
| 6,270,616 B1 | 8/2001 | Punsly | |
| 6,398,861 B1 | 6/2002 | Knox | |
| 6,572,971 B2 | 6/2003 | Martin | |
| 6,740,192 B1 | 5/2004 | Lu | |
| 6,800,157 B2 | 10/2004 | Tarbutton | |
| 7,806,976 B2 | 10/2010 | Nakao | |
| 8,491,749 B2 | 7/2013 | Gorodisher et al. | |
| 2002/0009581 A1 * | 1/2002 | Kishi | B29B 15/122 428/293.1 |
| 2007/0027233 A1 | 2/2007 | Yamaguchi | |
| 2011/0024039 A1 | 2/2011 | Campbell | |
| 2011/0048637 A1 | 3/2011 | Kohli | |
| 2012/0024477 A1 | 2/2012 | Kropp | |
| 2013/0037213 A1 | 2/2013 | Frick | |
| 2015/0059295 A1 | 3/2015 | Honda et al. | |
| 2018/0273811 A1 * | 9/2018 | Cura | C08K 3/04 |

FOREIGN PATENT DOCUMENTS

| | | |
|---|---|---|
| WO | WO 01/23466 | 4/2001 |
| WO | WO 2015/063024 | 5/2015 |

OTHER PUBLICATIONS

Panda, H., Modern Technology of Textile Dyes & Pigments (2nd Revised Edition), Chapter 1, Metal Pigments, Niir Project Consultancy Services, May 1, 2016, pp. 1 to 14.

Supplementary European Search Report for Application No. EP 17 76 0800, dated Aug. 9, 2019, 4 pages.

* cited by examiner

COMPOSITION INCLUDING EPOXY ADHESIVE AND ALUMINUM FLAKES AND METHOD FOR USING THE SAME

CROSS-REFERENCE TO RELATED APPLICATION

This application claims priority to U.S. Provisional Application No. 62/302,720, filed Mar. 2, 2016, the disclosure of which is incorporated by reference in its entirety herein.

BACKGROUND

Adhesives have been used in many structural applications. Such structural applications have included vehicles, computer cases, buildings, and appliances. For example, structural adhesives have been used in vehicle assembly (e.g., automobile and aircraft assembly) to replace or augment conventional joining techniques such as welds, nuts and bolts, and rivets. Epoxy compositions are known and have been used for structural adhesive applications. Tougheners have been included in epoxy adhesive compositions to improve the impact resistance of the adhesive. See, for example, U.S. Pat. No. 6,800,157 (Tarbutton et al.).

Aluminum flake has been incorporated as a filler into coatings and adhesives. See, for example, U.S. Pat. No. 4,920,002 (Cussot et al.). Certain fatty acids are sometimes used during the milling of aluminum flake as milling aids. See, for example, U.S. Pat. No. 3,234,038 (Stephens et al.) and U.S. Pat. No. 3,181,962 (Rolles) and European Pat. Pub. No. 0015725, published Sep. 17, 1980.

SUMMARY

The curable composition according to the present disclosure includes aluminum flake. We have found that aluminum flake, presumably due to its plate-like nature, tends to drive the failure mode of articles bonded with the adhesive to cohesive failure. Cohesive failure of an adhesively-bonded joint leaves a layer of adhesive on the metal, limiting the corrosion of a failed joint. We did not expect that the aluminum flake would affect the impact or peel strength of the adhesive. Unexpectedly it has now been found that heating the fatty acid coated aluminum flake before incorporating it into the adhesive composition improves the peel strength and impact resistance of the adhesive over adhesives including aluminum flake that has not been heated after milling.

In one aspect, the present disclosure provides a curable adhesive composition including a curable epoxy resin, an amine curing agent, a toughening agent, and aluminum flakes. The aluminum flakes comprise a fatty acid milling aid on at least a portion of their surfaces. The aluminum flakes have been heated after milling.

In some embodiments, the curable adhesive composition is packaged as a two-part adhesive, in which a first part includes the amine curing agent, a second part includes the curable epoxy resin, at least one of the first part or the second part includes the toughening agent, and at least one of the first part or second part includes the aluminum flakes. Accordingly, in another aspect, the present disclosure provides an adhesive dispenser comprising a first chamber and a second chamber. The first chamber comprises the first part, and the second chamber comprises the second part.

In another aspect, the present disclosure provides a method of forming an adhesive bond between members. The method includes applying the curable adhesive composition described above to a surface of at least one of two or more members, joining the members so that the curable adhesive composition is sandwiched between the two or more members, and curing the curable adhesive composition to form an adhesive bond between the two or more members.

In another aspect, the present disclosure provides an article including a cured adhesive composition sandwiched between at least two members. The cured adhesive composition includes aluminum flakes within a toughened epoxy resin cured with an amine curing agent. The aluminum flakes include a fatty acid milling aid on at least a portion of their surfaces. The aluminum flakes have been heated after milling.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility, but may be swellable in the presence of an appropriate solvent.

The term "polymer or polymeric" will be understood to include polymers, copolymers (e.g., polymers formed using two or more different monomers), oligomers or monomers that can form polymers, and combinations thereof, as well as polymers, oligomers, monomers, or copolymers that can be blended.

"Alkyl group" and the prefix "alk-" are inclusive of both straight chain and branched chain groups and of cyclic groups. In some embodiments, alkyl groups have up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms. Terminal "alkenyl" groups have at least 3 carbon atoms.

"Alkylene" is the multivalent (e.g., divalent or trivalent) form of the "alkyl" groups defined above.

"Arylalkylene" refers to an "alkylene" moiety to which an aryl group is attached. "Alkylarylene" refers to an "arylene" moiety to which an alkyl group is attached.

The terms "aryl" and "arylene" as used herein include carbocyclic aromatic rings or ring systems, for example, having 1, 2, or 3 rings and optionally containing at least one heteroatom (e.g., O, S, or N) in the ring optionally substituted by up to five substituents including one or more alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

The above summary of the present disclosure is not intended to describe each disclosed embodiment or every implementation of the present disclosure. The description that follows more particularly exemplifies illustrative embodiments. It is to be understood, therefore, that the following description should not be read in a manner that would unduly limit the scope of this disclosure.

DETAILED DESCRIPTION

Epoxy compounds useful for the curable compositions according to the present disclosure include aromatic polyepoxide resins (e.g., a chain-extended diepoxide or novolac epoxy resin having at least two epoxide groups) and aromatic monomeric diepoxides. A crosslinkable epoxy resin typically will have at least two epoxy end groups. The aromatic polyepoxide or aromatic monomeric diepoxide typically contains at least one (in some embodiments, at least 2, in some embodiments, in a range from 1 to 4) aromatic ring that is optionally substituted by a halogen (e.g., fluoro, chloro, bromo, iodo), alkyl having 1 to 4 carbon atoms (e.g., methyl or ethyl), or hydroxyalkyl having 1 to 4 carbon atoms (e.g., hydroxymethyl). For epoxy resins containing two or more aromatic rings, the rings may be connected, for example, by a branched or straight-chain alkylene group having 1 to 4 carbon atoms that may optionally be substituted by halogen (e.g., fluoro, chloro, bromo, iodo).

Examples of aromatic epoxy resins useful in the curable compositions disclosed herein include novolac epoxy resins (e.g., phenol novolacs, ortho-, meta-, or para-cresol novolacs or combinations thereof), bisphenol epoxy resins (e.g., bisphenol A, bisphenol F, halogenated bisphenol epoxies, and combinations thereof), resorcinol epoxy resins, tetrakis phenylolethane epoxy resins and combinations of any of these. Useful epoxy compounds include diglycidyl ethers of difunctional phenolic compounds (e.g., p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.) In some embodiments, the adhesive includes a bisphenol diglycidyl ether, wherein the bisphenol (i.e., —O—$C_6H_5$—$CH_2$—$C_6H_5$—O—) may be unsubstituted (e.g., bisphenol F), or either of the phenyl rings or the methylene group may be substituted by one or more halogens (e.g., fluoro, chloro, bromo, iodo), methyl groups, trifluoromethyl groups, or hydroxymethyl groups.

Examples of aromatic monomeric diepoxides useful in the curable compositions according to the present disclosure include the diglycidyl ethers of bisphenol A and bisphenol F and mixtures thereof. Bisphenol epoxy resins, for example, may be chain extended to have any desirable epoxy equivalent weight. Chain extending epoxy resins can be carried out by reacting a monomeric diepoxide, for example, with a bisphenol in the presence of a catalyst to make a linear polymer.

In some embodiments, the aromatic epoxy resin (e.g., either a bisphenol epoxy resin or a novolac epoxy resin) may have an epoxy equivalent weight of at least 150, 170, 200, or 225 grams per equivalent. In some embodiments, the aromatic epoxy resin may have an epoxy equivalent weight of up to 2000, 1500, or 1000 grams per equivalent. In some embodiments, the aromatic epoxy resin may have an epoxy equivalent weight in a range from 150 to 2000, 150 to 1000, or 170 to 900 grams per equivalent. In some embodiments, the first epoxy resin has an epoxy equivalent weight in a range from 150 to 450, 150 to 350, or 150 to 300 grams per equivalent. Epoxy equivalent weights may be selected, for example, so that the epoxy resin may be used as a liquid or solid, as desired.

For some applications, it may be useful to incorporate a flexible, non-aromatic chain into the crosslinked epoxy network. In some cases, non-aromatic epoxy resins can be useful as reactive diluents that may help control the flow characteristics of the adhesive composition. A non-aromatic epoxy useful in the curable compositions according to the present disclosure can include a branched or straight-chain alkylene group having 1 to 20 carbon atoms optionally interrupted with at least one —O— and optionally substituted by hydroxyl. In some embodiments, the non-aromatic epoxy can include a poly(oxyalkylene) group having a plurality (x) of oxyalkylene groups, $OR^1$, wherein each IV is independently $C_2$ to $C_5$ alkylene, in some embodiments, $C_2$ to $C_3$ alkylene, x is 2 to about 6, 2 to 5, 2 to 4, or 2 to 3. To become crosslinked into a network, useful non-aromatic epoxy resins will typically have at least two epoxy end groups. Examples of useful non-aromatic epoxy resins include glycidyl epoxy resins such as those based on diglycidyl ether compounds comprising one or more oxyalkylene units. Examples of these include resins made from ethylene glycol diglycidyl ether, propylene glycol diglycidyl ether, diethylene glycol diglycidyl ether, dipropylene glycol diglycidyl ether, polyethylene glycol diglycidyl ether, polypropylene glycol diglycidyl ether, glycerol diglycidyl ether, glycerol triglycidyl ether, propanediol diglycidyl ether, butanediol diglycidyl ether, and hexanediol diglycidyl ether. Other useful non-aromatic epoxy resins include a diglycidyl ether of cyclohexane dimethanol, a diglycidyl ether of neopentyl glycol, a triglycidyl ether of trimethylolpropane, and a diglycidyl ether of 1,4-butanediol. In some embodiments, the non-aromatic epoxy is present at up to 20 (in some embodiments, 15, 10, 9, 8, 7, 6, or 5) percent by weight, based on the total weight of epoxy resin in the curable adhesive composition.

Crosslinked aromatic epoxies (that is, epoxy polymers) as described herein will be understood to be preparable by crosslinking aromatic epoxy resins. The crosslinked aromatic epoxy typically contains a repeating unit with at least one (in some embodiments, at least 2, in some embodiments, in a range from 1 to 4) aromatic ring (e.g., phenyl group) that is optionally substituted by one or more halogens (e.g., fluoro, chloro, bromo, iodo), alkyl groups having 1 to 4 carbon atoms (e.g., methyl or ethyl), or hydroxyalkyl groups having 1 to 4 carbon atoms (e.g., hydroxymethyl). For repeating units containing two or more aromatic rings, the rings may be connected, for example, by a branched or straight-chain alkylene group having 1 to 4 carbon atoms that may optionally be substituted by halogen (e.g., fluoro, chloro, bromo, iodo).

Several curable epoxy resins useful in the curable composition according to the present disclosure are commercially available. For example, several epoxy resins of various classes and epoxy equivalent weights are available from Dow Chemical Company, Midland, Mich.; Momentive Specialty Chemicals, Inc., Columbus, Ohio; Huntsman Advanced Materials, The Woodlands, Tex.; CVC Specialty Chemicals Inc. Akron, Ohio (acquired by Emerald Performance Materials); and Nan Ya Plastics Corporation, Taipei City, Taiwan. Examples of commercially available glycidyl ethers include diglycidylethers of bisphenol A (e.g. those available under the trade designations "EPON 828", "EPON 1001", "EPON 1310" and "EPON 1510" from Hexion Specialty Chemicals GmbH, Rosbach, Germany, those available under the trade designation "D.E.R." from Dow Chemical Co. (e.g., D.E.R. 331, 332, and 334), those available under the trade designation "EPICLON" from Dainippon Ink and Chemicals, Inc. (e.g., EPICLON 840 and 850) and those available under the trade designation "YL-980" from Japan Epoxy Resins Co., Ltd.); diglycidyl ethers of bisphenol F (e.g. those available under the trade designation "EPICLON" from Dainippon Ink and Chemicals, Inc. (e.g., "EPICLON 830")); polyglycidyl ethers of novolac resins (e.g., novolac epoxy resins, such as those available under the trade designation "D.E.N." from Dow Chemical Co. (e.g., D.E.N. 425, 431, and 438)); and flame retardant epoxy resins (e.g., "D.E.R. 580", a brominated bisphenol type epoxy resin available from Dow Chemical Co.). Examples of commercially available non-aromatic epoxy resins include the glycidyl ether of cyclohexane dimethanol, available from Hexion Specialty Chemicals GmbH, under the trade designation "HELOXY MODIFIER 107".

The curable adhesive composition includes an amine curing agent capable of crosslinking the epoxy resin. The amine curing agent includes at least two amino groups and may be aromatic, aliphatic (e.g., linear or cycloaliphatic), or a combination thereof. The amino groups in the amine curing agent are each independently primary or secondary amino groups. Typically, at least one of the amino groups is a primary amino group so that a crosslinked network may form. In some embodiments, the amine curing agent includes at least two primary amino groups.

Useful amine curing agents may be aliphatic amines including at least two amino groups. In some embodiments, an alkylene polyamine, for example, a linear or branched alkylene polyamine is included in the curable composition. Useful alkylene polyamines include ethylene amines (e.g., ethylenediamine, diethylenetriamine, triethylenetetramine, etc.), propylamines (e.g., dimethylaminopropyl amine, diethylaminopropylamine, and cyclohexylaminopropylamine), higher alkylenediamines (e.g., hexamethylenediamine, methylpentamethylenediamine, and trimethylhexanediamine), polyetheramines (e.g., polyoxyalkylene diamines such as polyoxypropylene diamines of various molecular weights and 4,7,10-trioxa-1,13-tridecane diamine).

An amine curing agent useful in the curable compositions disclosed herein can comprise at least two amino groups and at least one aromatic ring. The amine curing agent may be an aromatic polyamine, in which the amino groups are bonded directly to the aromatic ring, or an arylalkylenyl polyamine, in which the amino groups are bonded to alkylene groups that are in turn bonded to the aromatic ring. An amine curing agent may also contain two or more aromatic rings and at least two amino groups. In any of these embodiments, the aromatic ring can be unsubstituted or substituted by one or more halogens (e.g., fluoro, chloro, bromo, iodo), alkyl groups having 1 to 4 carbon atoms (e.g., methyl or ethyl), or hydroxyalkyl groups having 1 to 4 carbon atoms (e.g., hydroxymethyl). For amines containing two or more aromatic rings, the rings may be directly connected or connected, for example, by a branched or straight-chain alkylene group having 1 to 4 carbon atoms that may optionally be substituted by one or more halogens (e.g., fluoro, chloro, bromo, iodo), an oxygen, a sulfur, or a sulfone group. Examples of suitable amine curing agents that comprise at least two amino groups and at least one aromatic ring include phenylenediamine (e.g., meta-phenylenediamine or para-phenylenediamine), diethyl toluene diamine (e.g., in any of its isomeric forms), diamino toluene (e.g., 2,3-diaminotoluene and 3,4-diaminotoluene, and methyl-m-phenylenediamine), 1,2-diamino-3,5-dimethylbenzene, 4,5-dimethyl-1,2-phenylenediamine, 2,4,6-trimethyl-m-phenylenediamine, 2,3,5,6-tetramethyl-p-phenylenediamine, aminobenzylamines (e.g., 2-aminobenzylamine and 4-aminobenzylamine), ethylenedianiline, 2,2'-biphenyldiamine, diaminodiphenylmethane, diaminodiphenylsulfone, halogenated substituted pheneylene diamines (e.g., 4-chloro-1,3-diaminobenzene, 4-chloro-1,2-diaminobenzene, and 4-bromo-1,2-diaminobenzene), a xylylenediamine (e.g., ortho-xylylenediamine or meta-xylylenediamine), and 4-(2-aminoethyl)aniline.

An amine curing agent useful in the curable compositions disclosed herein can comprise at least two amino groups and at least one cycloaliphatic ring. The amino groups may be bonded directly to the cycloaliphatic ring, or the amino groups may be bonded to straight-chain or branched alkylene groups that are in turn bonded to the cycloaliphatic ring. An amine curing agent may also contain two or more cycloaliphatic rings and at least two amino groups. In any of these embodiments, the cycloaliphatic ring can be unsubstituted or substituted by one or more halogens (e.g., fluoro, chloro, bromo, iodo), straight-chain or branched alkyl groups having 1 to 4 carbon atoms (e.g., methyl or ethyl), or hydroxyalkyl groups having 1 to 4 carbon atoms (e.g., hydroxymethyl). In any of these embodiments, the cycloaliphatic ring may be a carbocyclic ring, for example, including no heteroatoms such as sulfur or nitrogen. For amines containing two or more cycloaliphatic rings, the rings may be directly connected or connected, for example, by a branched or straight-chain alkylene group having 1 to 4 carbon atoms that may optionally be substituted by one or more halogens (e.g., fluoro, chloro, bromo, iodo), an oxygen, a sulfur, or a sulfone group. Examples of suitable amine curing agents that comprise at least two amino groups and at least one cycloaliphatic group are the fully or partially hydrogenated products of any of the amine curing agents that comprise at least two amino groups and at least one aromatic ring described above. For example, suitable amine curing agents include diaminocyclohexanes (e.g., 1,2-diaminocyclohexane or 1,4-diaminocyclohexane in their cis- or trans-forms) and 3-aminomethyl-3,5,5-trimethylcyclohexylamine (also called isophorone diamine).

Several amine curing agents including at least two amino groups and at least one of an aromatic ring or a cycloaliphatic ring are available, for example, from Lonza, Basel, Switzerland, and Amberlite Corporation, Baton Rouge, La. Other amine curing agents that may be useful include polyetheramines available, for example, from Huntsman Chemical, The Woodlands, Tex., under the trade designation "JEFFAMINE".

In some embodiments, the molar ratio of epoxy groups on the curable epoxy resin to amine hydrogens on the amine curing agent ranges from about 0.5:1 to about 3:1, in some embodiments, in a range from about 0.5:1 to about 2:1, or about 1:1.

An epoxy cured with an amine curing agent will typically have crosslinked units represented by formula,

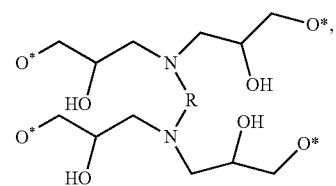

wherein R is an aryl, arylalkylene, alkylene-arylalkylene, a branched alkylene, straight-chain alkylene, or cycloalkylene group as described above, optionally including ether linkages, and wherein *indicates that the 0 is bonded to the epoxide backbone, usually to an aromatic ring, although in some embodiments, to a cycloaliphatic ring or a branched or straight-chain alkylene group having 1 to 20 carbon atoms optionally interrupted with at least one —O— and optionally substituted by hydroxyl as described above.

In some embodiments, the curable adhesive composition is packaged as a two-part adhesive, in which a first part includes the amine curing agent and a second part includes the curable epoxy resin. The first part may be referred to as the "accelerator component" and can comprise the curing agent(s) and any catalysts. The second part may be referred to as the "base resin component" and can comprise any curable resins. The other components of the curable adhesive composition, described in further detail below, can be included in one or both the first and second parts. The present disclosure further provides an adhesive dispenser comprising a first chamber and a second chamber. The first chamber comprises the first part, and the second chamber comprises the second part.

Curable adhesive compositions according to the present disclosure comprise a toughening agent. Toughening agents may be useful, for example, for improving the properties (e.g., peel strength) of some cured epoxies, for example, so that they do not undergo brittle failure in a fracture. The toughening agent (e.g., an elastomeric resin or elastomeric filler) may or may not be covalently bonded to the curable epoxy and ultimately the crosslinked network. In some embodiments, the toughening agent includes an epoxy-terminated compound, which can be incorporated into the polymer backbone. Examples of useful toughening agents, which may also be referred to as elastomeric modifiers, include polymeric compounds having both a rubbery phase and a thermoplastic phase such as graft copolymers having a polymerized diene rubbery core and a polyacrylate or polymethacrylate shell; graft copolymers having a rubbery core with a polyacrylate or polymethacrylate shell; elastomeric particles polymerized in situ in the epoxide from free-radical polymerizable monomers and a copolymeric stabilizer; elastomer molecules such as polyurethanes and thermoplastic elastomers; separate elastomer precursor molecules; combination molecules that include epoxy-resin segments and elastomeric segments; and, mixtures of such separate and combination molecules. The combination molecules may be prepared by reacting epoxy resin materials with elastomeric segments; the reaction leaving reactive functional groups, such as unreacted epoxy groups, on the reaction product.

The use of tougheners in epoxy resins is described in the Advances in Chemistry Series No. 208 entitled "Rubbery-Modified Thermoset Resins", edited by C. K. Riew and J. K. Gillham, American Chemical Society, Washington, 1984. The amount of toughening agent to be used depends in part upon the final physical characteristics of the cured resin desired, and is generally determined empirically.

In some embodiments, the toughening agent in the curable epoxy resin includes graft copolymers having a polymerized diene rubbery backbone or core to which is grafted a shell of an acrylic acid ester or methacrylic acid ester, monovinyl aromatic hydrocarbon, or a mixture thereof, such as those disclosed in U.S. Pat. No. 3,496,250 (Czerwinski). Rubbery backbones can comprise polymerized butadiene or a polymerized mixture of butadiene and styrene. Shells comprising polymerized methacrylic acid esters can be lower alkyl ($C_{1-4}$) methacrylates. Monovinyl aromatic hydrocarbons can be styrene, alpha-methylstyrene, vinyltoluene, vinylxylene, ethylvinylbenzene, isopropylstyrene, chlorostyrene, dichlorostyrene, and ethylchlorostyrene.

Further examples of useful toughening agents are acrylate core-shell graft copolymers wherein the core or backbone is a polyacrylate polymer having a glass transition temperature ($T_g$) below about 0° C., such as poly(butyl acrylate) or poly(isooctyl acrylate) to which is grafted a polymethacrylate polymer shell having a $T_g$ about 25° C. such as poly (methyl methacrylate). For acrylic core/shell materials "core" will be understood to be acrylic polymer having $T_g<0°$ C. and "shell" will be understood to be an acrylic polymer having $T_g>25°$ C. Some core/shell toughening agents (e.g., including acrylic core/shell materials and methacrylate-butadiene-styrene (MBS) copolymers wherein the core is crosslinked styrene/butadiene rubber and the shell is polymethylacrylate) are commercially available, for example, from Dow Chemical Company under the trade designation "PARALOID".

Another useful core-shell rubber is described in U.S. Pat. Appl. Publ. No. 2007/0027233 (Yamaguchi et al.). Core-shell rubber particles as described in this document include a cross-linked rubber core, in most cases being a cross-linked copolymer of butadiene, and a shell which is preferably a copolymer of styrene, methyl methacrylate, glycidyl methacrylate and optionally acrylonitrile. The core-shell rubber can be dispersed in a polymer or an epoxy resin. Examples of useful core-shell rubbers include those sold by Kaneka Corporation under the designation Kaneka KANE ACE, including the Kaneka KANE ACE 15 and 120 series of products, including Kaneka "KANE ACE MX 153", Kaneka "KANE ACE MX 154", Kaneka "KANE ACE MX 156", Kaneka "KANE ACE MX 257" and Kaneka "KANE ACE MX 120" core-shell rubber dispersions, and mixtures thereof. The products contain the core-shell rubber (CSR) particles pre-dispersed in an epoxy resin, at various concentrations. For example, "KANE ACE MX 153" core-shell rubber dispersion comprises 33% CSR, "KANE ACE MX 154" core-shell rubber dispersion comprises 40% CSR, and "KANE ACE MX 156" core-shell rubber dispersions comprises 25% CSR.

Still further examples of toughening agents useful in the curable composition according to the present disclosure are elastomeric particles that have a $T_g$ below about 25° C. and have been polymerized in situ in the epoxide before mixing with the other components of the curable composition. These elastomeric particles are polymerized from free-radical polymerizable monomers and a copolymerizable polymeric stabilizer that is soluble in the epoxide. The free-radical polymerizable monomers are ethylenically unsaturated monomers or diisocyanates combined with coreactive difunctional hydrogen compounds such as diols, diamines, and alkanolamines. Examples of these elastomeric particles are disclosed in U.S. Pat. No. 4,524,181 (Adam et al.). These particles are commonly referred to as "organosols".

Still other toughening agents are rubber modified liquid epoxy resins. For example, an ABA block copolymer elastomer with epoxy-reactive groups can be reacted with an epoxy resin to provide a rubber-modified liquid epoxy resin. An ABA block copolymer elastomer generally is one where the A blocks are polystyrenic, and the B blocks are conjugated dienes (e.g., lower alkylene dienes). The A block is generally formed predominantly of substituted (e.g, alkylated) or unsubstituted styrenic moieties (e.g., polystyrene, poly(alphamethylstyrene), or poly(t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which blocks may be made from the same or different monomers. An example of such a resin is an elastomer available from Kraton Performance Polymers under the trade designation "KRATON RP6565". The modified epoxy resin is made from 85% by weight of epoxy resin "EPON 828" and 15% by weight of a rubber obtained under trade designation "KRATON". Rubbers obtained under the trade designation "KRATON" are known in the industry as elastomeric block copolymers.

Other useful toughening agents include carboxyl- and amine-terminated acrylonitrile/butadiene elastomers such as those obtained from Emerald Performance Materials, Akron, Ohio, under the trade designation "HYPRO" (e.g., CTBN and ATBN grades); carboxyl- and amine-terminated butadiene polymers such as those obtained from Emerald Performance Materials under the trade designation "HYPRO" (e.g., CTB grade); amine-functional polyethers such as any of those described above; and amine-functional polyurethanes such as those described in U.S. Pat. Appl. No. 2013/0037213 (Frick et al.). Polyurethane toughening agents can also include polyurethane-modified epoxy resins, isocyanate-modified epoxy resins, and combinations thereof. Isocyanate modified epoxy resins can have oxazolidine functionality if the isocyanate reacts directly with the epoxy, or ureido functionality if the isocyanate reacts with secondary hydroxyl groups present in the epoxy molecule. Examples of isocyanate- or polyurethane-modified epoxy resins useful as toughening agents in the curable adhesive compositions of the present disclosure include those available under the trade designations "EPU-17T-6", "EPU-78-11", and "EPU-1761", available from Adeka Co., those under the trade name, "D.E.R. 6508", from Dow Chemical Co., and those under the trade name, "AER 4152", available from Asahi Denka.

In some embodiments, the toughener is an acrylic core/shell polymer; a styrene-butadiene/methacrylate core/shell polymer; a polyether polymer; a carboxyl- or amino-terminated acrylonitrile/butadiene; a carboxylated butadiene, a polyurethane, or a combination thereof.

In some embodiments, the toughening agent present in the curable composition in an amount up to about 75 parts by weight per 100 parts of epoxy resin. In some embodiments, the curable adhesive composition contains up to 75 parts, in some embodiments, in the range of from about 5 parts to about 75 or in a range from about 10 parts to about 50 parts, by weight of polymeric toughener based on 100 parts by weight of the reactive epoxy resin. For a two-part adhesive composition according to the present disclosure, the toughening agent can be added to the first part, the second part, or both. The toughening agent can be pre-dispersed with an amine curing agent in the first part and/or pre-dispersed with an epoxy resin in the second part, if desired.

In some embodiments, the curable resin composition according to the present disclosure includes a catalyst. Examples of catalysts that may be useful for accelerating the cure of epoxy resins and the amine curing agents described above in any of their embodiments include tertiary amines and cyclic amidines (e.g., imidazoles). Examples of suitable cyclic amidines include an imidazole, an imidazoline, a substituted imidazole compound, a substituted imidazoline compound, 1,4,5,6-tetrahydropyrimidine, a substituted 1,4,5,6-tetrahydropyrimidine compound, and combinations thereof. Suitable tertiary amines include benzyldimethylamine, diazabicycloundecene, and tertiary amines that include phenolic hydroxyl groups (e.g., dimethylaminomethylphenol and tris(dimethylaminomethyl)phenol, and combinations. Another suitable catalyst includes a tertiary amine available from BASF Corporation, Florham Park, N.J., under the trade designation "VERSAMINE EH 30". Any suitable amount of catalyst may be used, depending on the desired reaction rate. In some embodiments, the amount of catalyst is in a range from 0.1 to 7.5 (in some embodiments, 0.5 to 5, 0.5 to 3, or 0.5 to 2.5) percent by weight, based on the total weight of the curable adhesive composition. For a two-part adhesive composition according to the present disclosure, the catalyst is typically added to the first part.

The curable composition according to the present disclosure includes aluminum flake. Aluminum filler can provide corrosion protection to substrates when used in an adhesive composition. Aluminum flake was selected for the curable composition according to the present disclosure to drive the failure mode of articles bonded with the adhesive to cohesive failure. The plate-like nature of the aluminum flakes is believed responsible for the predominance of a cohesive failure mode in a failed joint. Cohesive failure of an adhesively-bonded joint leaves a layer of adhesive on the metal, limiting the corrosion of a failed joint.

Aluminum flake is typically produced by milling aluminum particles such as foil scrap or aluminum powder in a mill (e.g., a ball mill or a stamping mill). Milling can be carried out dry or wet (that is, in the presence of solvent). The aluminum flake useful in the curable composition according to the present disclosure is generally a milled product produced by dry milling. Dry milling refers to milling carried out in the absence of organic solvent (e.g., volatile organic solvents such as mineral spirits). Dry milling is typically carried out in the presence of a milling aid to improve the stability of the aluminum metal and protect of aluminum flake from oxidation. The milling aid typically remains on the flake after milling and may be present in an amount of up to about 5, 4, 3, or 2 percent by weight, based on the total weight of the aluminum flake. Heat can be generated during the milling process. However, the aluminum flakes in the adhesive compositions according to the present disclosure are heated after milling, generally after at least one of packaging, shipping, or storing the aluminum flakes.

The milling aid useful for the aluminum flake in the curable compositions according to the present disclosure is a fatty acid or a mixture of fatty acids. A fatty acid can be represented by formula RCOOH, wherein R is an alkyl group or alkenyl group having about 1 to 30 (in some embodiments, 6 to 26, 8 to 26, or 8 to 22) carbon atoms. Short chain fatty acids are typically considered those that have less than 6 carbon atoms, and long chain fatty acids are those that have 6 or more carbon atoms. The common names of the long-chain saturated fatty acids having from eight to twenty six carbon atoms are caprylic acid (C8), capric acid (C10), lauric acid (C12), myristic acid (C14), palmitic acid (C16), stearic acid (C18), arachidic acid (C20), behenic acid (C22), lignoceric acid (C24), and cerotic acid (C26). The fatty acid milling aid can include mixtures of any of these fatty acids. Certain fatty acids (e.g., stearic acid) provide leafing grades of aluminum flake, and other fatty acids (e.g., oleic acid or short chain fatty acids) provide non-leafing grades of aluminum flake. Leafing grades generally become arranged in a parallel relation to a surface when dispersed in a composition while non-leafing grades tend to have a random orientation in a composition. In some embodiments, the fatty acid milling aid comprises stearic acid or a decomposition product thereof.

In the curable composition according to the present disclosure, conventionally milled aluminum flakes, which include a fatty acid on at least a portion of the surfaces thereof, is heated after milling. While this disclosure is not to be bound by theory, the heating may physically or chemically modify the fatty-acid-containing aluminum flakes. Heating the aluminum flakes can result in one of more of the following effects: a change in the thermogravimetric curve produced by thermogravimetric analysis, a change in the visual appearance of the adhesive composition before or after curing, an improvement in at least one of T-Peel strength or Impact Peel strength of an adhesive bond made from the curable adhesive composition. The heating may be carried out at any temperature wherein at least one of these affects is observed. For example, the aluminum flakes may be treated at a temperature, above room temperature, of at least 75° C., 80° C., 90° C., or 100° C. In some embodiments, the aluminum flakes are heated after milling at a temperature in a range from 100° C. to 150° C.

Samples of the aluminum flakes treated in different ways were analyzed by Thermogravimetric Analysis using a thermogravimetric analyzer model Q50 from TA Instruments, New Castle, Del. An aluminum flake heated as described in Example 1, below, showed two distinct changes in decomposition rate at roughly 240° C. and 395° C. while an unheated flake as described in Illustrative Example A had four distinct changes with only a change at 395° C. being the same as the heated flake. Washing with toluene removed the early peaks, and the resulting sample showed had two peaks, one at ~350° C. overlapping with the 395° C. peak. Heating at 80° C. for a week removed the first peak seen in the unheated flake (~150° C.), but the other three peaks of the unheated flake were observed.

Heating the aluminum flakes can improve impact strength at room temperature and at −20° C. and T-Peel strength. It was unexpected that the aluminum flake would affect the impact or peel strength of the adhesive. In some embodiments, the curable adhesive composition according to the present disclosure provides upon curing an adhesive bond with at least one of an improved T-Peel strength or an improved Impact Peel Strength relative to a comparative adhesive composition, wherein the comparative adhesive composition is the same as the curable adhesive composition except that the aluminum flake, which includes the fatty acid on at least a portion of the surfaces thereof, is not heated after milling. Visual inspection of the fracture surface under magnification for T-Peel and Impact Peel specimens revealed that the flake appears to be better dispersed after the aluminum flake is heated as described in Example 1 below than when the aluminum flake is not heated.

Heating the aluminum flake can be carried out by placing the aluminum flake, which includes the fatty acid on at least a portion of the surfaces thereof, in an oven and allowing it to cool before adding it to the curable adhesive composition. On an industrial scale, about 50, 40, 30, 20, 10, or 5 pounds of aluminum flake in a 10 gallon drum can be placed in an oven at a temperature of about 220° F. to 250° F. (104.4° C. to 121.1° C.) for about 16 hours and then allowed to cool to room temperature. This process can be repeated. Variability in the oven temperature can be associated with carrying out the heating on an industrial scale. If desired to protect the aluminum flake from contamination, the drum may be loosely covered with a lid, but not sealed. Heating the aluminum flake can also be carried out on a smaller scale, for example, in a pint-sized jar in a laboratory oven before adding it to the curable adhesive composition. In some embodiments, the aluminum flakes are heated after milling in an environment set at a temperature in a range from 100° C. to 150° C. The environment can be, for example, an oven.

As shown in a comparison between Example 1 and Illustrative Example A, heating the aluminum flake at a temperature of at least 100° C. resulted in an unexpected improvement in Impact Peel Strength at −20° C. of more than 50% and an unexpected improvement in Impact Peel Strength at 23° C. of more than 40% in comparison to an adhesive composition than included the same aluminum flake that was not heated before adding it to the adhesive composition. Similarly, heating the aluminum flake at a temperature of at least 100° C. resulted in an unexpected improvement in T-Peel Strength at 23° C. of about 18% in comparison to an adhesive composition than included the same aluminum flake that was not heated before adding it to the adhesive composition.

For a two-part adhesive composition according to the present disclosure, the aluminum flake can be added to first part, the second part, or both. In some embodiments, the aluminum flake is added to the first part.

Various additives may be included in the curable compositions according to the present disclosure, for example, to alter the characteristics of the cured composition. Examples of useful additives include corrosion inhibitors such as some silica gels, thixotropic agents such as fumed silica; pigments (e.g., ferric oxide, brick dust, carbon black, and titanium oxide), reinforcing agents (e.g., silica, magnesium sulfate, calcium sulfate, and beryllium aluminum silicate), clays such as bentonite, and any suitable filler (e.g., glass beads, talc, and calcium metasilicate). Amounts of up to about 30, 40, 50, or more parts of additives per 100 parts of liquid adhesive components may be effectively utilized.

In some embodiments, compositions according to the present disclosure include a silane coupling agent. Examples of suitable silane coupling agents include those represented by formula L-1[R$^2$Si(Y)$_3$]$_k$. In this formula, L is an amino group (e.g., primary or secondary amino group), a mercapto group (i.e., HS—), or an epoxy group (i.e.,

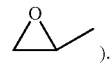

).

Such L groups are capable of reacting with an epoxy resin. In some embodiments, L is an epoxy group. In formula L-[R$^2$Si(Y)$_3$]$_k$, k is typically 1, but when L is an amino group, k is 1 or 2. In formula L-[R$^2$Si(Y)$_3$]$_k$, R$^2$ is alkylene (e.g., having up to 8, 6, or 4 carbon atoms) optionally interrupted by at least one ether linkage, and Y is a hydroylzable group such as halogen (i.e., fluoride, chloride, bromide, or iodide), alkoxy (i.e., —O-alkyl), acyloxy (i.e., —OC(O)alkyl), or aryloxy (i.e., —O-aryl). Silane coupling agents can be useful for promoting adhesion between the epoxy resin and a filler (e.g., siliceous filler) in the composition or between the epoxy resin and a substrate onto which it is dispensed. Examples of useful silane coupling agents include 3-glycidoxypropyltrimethoxysilane, available, for example, from Dow Corning Corporation, Midland, Mich., under the trade designation "DOW CORNING Z-6040 SILANE"; bis(trimethoxysilylpropyl)amine available, for example, from Gelest, Morrisville, Pa.; (3-aminopropyl)

trimethoxysilane, (3-aminopropyl)triethoxysilane), (3-mercaptopropyl)trimethoxysilane, and (3-mercaptopropyl)triethoxysilane available, for example, from Sigma-Aldrich, St. Louis, Mo. In some embodiments, the curable adhesive composition includes 3-glycidoxypropyltrimethoxysilane. Silane coupling agents can be present in the curable adhesive composition in an amount of up to 5, 4, 3, 2, or 1 weight percent, based on the total weight of the adhesive composition. Coupling agents include epoxy groups can be incorporated into the second part of a two-part adhesive composition, for example. Coupling agents including amino groups can be incorporated into the first part of a two-part adhesive composition, for example.

In some embodiments, the curable adhesive composition includes a plasticizer. Useful plasticizers can include non-functional plasticizers such as aliphatic and aromatic hydrocarbons, alkyl esters, alkyl ethers, aryl esters, and aryl ethers. Examples of useful plasticizers include isodecyl benzoate and those available from Genovique Specialties Corporation, Rosemont, Ill., under the trade designation "BENZOFLEX". Useful plasticizers can also include functional compounds such as alkyl alcohols, glycols, and glycol ethers. Examples of useful plasticizers include 3,3-dimethyl-1,2-epoxybutane, 1,2-epoxyoctane, 1,2-epoxyhexane, 1,2-epoxybutane, 1,2-epoxydodecane, α-pinene, 2-octanol, 3,3,5-trimethylcyclohexyl methacrylate, limonene, β-pinene, 1,2-epoxydecane, 1,8-cineole, limonene oxide, α-pinene oxide, C1-C10 glycidyl ethers (e.g., methyl glycidyl ether, ethyl glycidyl ether, isopropyl glycidyl ether, n-butyl glycidyl ether, isobutyl glycidyl ether, t-butyl glycidyl ether, and "EPODIL 746" and "EPODIL 747" available from Air Products and Chemicals Inc. in Allentown, Pa., USA), glycidyl ester derivative of versatic acid ("CARDURA N-10" available from Hexion Chemical in Europe), and hydroxyl acrylate monomer of glycidyl ester ("ACE Hydroxyl Acrylate Monomer" available from Hexion Chemical). Plasticizers can be present in the curable adhesive composition in an amount of up to 10, 5, 4, 3, 2, or 1 weight percent, based on the total weight of the adhesive composition. For a two-part adhesive composition according to the present disclosure, the plasticizer can be added to first part, the second part, or both. In some embodiments (including embodiments in which the plasticizer is epoxy-functional) the plasticizer is added to the second part.

In some embodiments, the curable adhesive composition is a two-part adhesive composition. In some of these embodiments the first part can include the adduct described in the Examples, below, (48.4 weight % (wt. %)), 4,7,10-trioxa-1,13-tridecane diamine (9.0 wt. %), m-xylenediamine (1.8 wt. %), an amine-terminated butadiene acrylonitrile copolymer (7.3 wt. %), a cycloaliphatic amine (8.2 wt. %), a tertiary amine (3.0 wt. %), calcium carbonate (4.5 wt. %), heated aluminum flake (4.2 wt. %), aluminum powder (4.2 wt. %), wollastonite (3.6 wt. %), hydrophobic fumed silica (5.0 wt. %), and glass beads (1.35 wt. %).

In some of these embodiments, the cycloaliphatic amine is a high functionality polycycloaliphatic polyamine curing agent, available under the trade designation "ANCAMINE 2167" from Air Products and Chemicals, Inc., Allentown, Pa.; the amine-terminated butadiene acrylonitrile copolymer is available under the trade designation "HYPRO 1300x21" from Emerald Performance Materials, LLC, Akron, Ohio; and the tertiary amine is a tertiary amine accelerator, available under the trade designation "VERSAMINE EH 30" from BASF Corporation, Florham Park, N.J. meta-Xylenediamine is commercially available from a variety of sources, including Mitsubishi Gas Chemical Company America, Inc., New York, N.Y. Calcium metasilicate (wollastonite) is commercially available from a variety of sources, including under the trade designations "NYAD G" and "NYGLOS" from Nyco Minerals, Inc., Willsboro, N.Y. Aluminum flake and aluminum powder are commercially available from a variety of sources including Eckart America Corporation, Louisville, Ky. Calcium carbonate, which may be useful to reduce shrinkage and increase corrosion resistance, is available from a variety of sources including Omya (Oftringen, Switzerland). Nano precipitated calcium carbonate (grade "NPCC-361") is available from NanoMaterials Technology (Singapore), and precipitated calcium carbonate (grade "CALPREC PE") is available from Cales de Llierca, S.A. (Girona, Spain). Fumed silica can be obtained from commercial sources, for example, Cabot Corporation, Boston, Mass. A synthetic amorphous silica with calcium hydroxide, obtained under the trade designation "SHIELDEX AC5" from Grace Davison, Columbia, Md., is reported to be useful for corrosion resistance.

In some embodiments in which the curable adhesive composition is a two-part adhesive composition, the second part is a composition available under the trade designation "3M IMPACT RESISTANT STRUCTURAL ADHESIVE, 200 ML CARTRIDGE, 07333" from 3M Company, St. Paul, Minn. In some embodiments, the first part and the second part of the two-part curable adhesive composition can be combined in a 1:2 volume ratio.

In some embodiments in which the curable adhesive composition is a two-part adhesive composition, the second part includes a bisphenol A epoxy resin, available, for example, from Hexion Specialty Chemicals under the trade designation "EPON 828"; a 40% core shell rubber in unmodified, liquid epoxy resin based on bisphenol-A, obtained under the trade designation "KANE ACE MX 154" from Kaneka Texas Corporation, Pasadena, Tex.; 3-glycidoxypropyltrimethoxysilane, available, for example, from Dow Corning; an aliphatic epoxy resin, for example, cyclohexane dimethanol diglycidyl ether, obtained under the trade designation "HELOXY 107" from Hexion Specialty Chemicals, calcium carbonate; a synthetic amorphous silica with calcium hydroxide, obtained under the trade designation "SHIELDEX AC5" from Grace Davison; phenolphthalein as a cure indicator; fumed silica; and a plasticizer, for example, isodecyl benzoate plasticizer, available under the trade designation "BENZOFLEX 131", from Genovique Specialties Corporation, Rosemont, Ill.

In some embodiments, the curable adhesive composition may be heated at an elevated temperature to effect curing. While it is not practical to enumerate a particular temperature suitable for all situations, generally suitable temperatures are in a range from about 30° C. to about 200° C. In some embodiments, the adhesive composition according to the present disclosure is provided as a two-part composition. Generally, the two components of a two-part adhesive are mixed prior to being applied to the substrates to be bonded. After mixing, the two-part adhesive gels, reaches a desired handling strength, and ultimately achieves a desired final strength. Some two-part adhesives can be exposed to elevated temperatures to cure, or at least to cure within a desired time. In some embodiments, heating at 60° C. to 80° C. for 15 minutes to 60 minutes, for example, can be useful for accelerating the cure. However, in some embodiments, the curable composition according to the present disclosure does not require heat to cure (that is, it is a room temperature curable adhesive) yet still provides high performance in peel strength and impact resistance.

Similarly, in some embodiments of the method according to the present disclosure, the curable adhesive composition is a two-part adhesive, in which a first part comprises the amine curing agent, a second part comprises the curable epoxy resin, at least one of the first part or the second part comprises the toughening agent, and at least one of the first part or the second part comprises the aluminum flakes. Applying the curable adhesive composition can be carried out, for example, by dispensing the curable adhesive composition from an adhesive dispenser comprising a first chamber, a second chamber, and a mixing tip, wherein the first chamber comprises the first part, wherein the second chamber comprises the second part, and wherein the first and second chambers are coupled to the mixing tip to allow the first part and the second part to flow through the mixing tip.

In some embodiments of the article according to the present disclosure, the article has a first surface and a second surface joined by an adhesive bond made with a cured mass of the adhesive composition described above in any of its embodiments. The cured adhesive includes aluminum flakes within a toughened epoxy resin cured with an amine curing agent. The aluminum flakes include a fatty acid milling agent on at least a portion of their surfaces, and the aluminum flake has been heated after milling. The cured adhesive composition may be useful for forming adhesive bonds between metallic components (e.g., iron, aluminum, titanium, magnesium, copper, etc. and alloys thereof), between non-metallic substrates (e.g., reinforced and unreinforced thermoplastic and thermoset polymers, as well as other organic materials or organic composite materials), and between metallic and non-metallic substrates. The article according to the present disclosure and/or made by the method of the present disclosure can form at least a portion of a vehicle. In some embodiments, the cured adhesive composition provides at least one of an improved T-Peel strength or an improved Impact Peel Strength relative to a comparative cured adhesive composition, wherein the comparative cured adhesive composition is the same as the cured adhesive composition except that the aluminum flakes are not heated after milling.

The adhesives described herein can be useful, for example, to assemble panels or other sheet-like structures with frame members. The adhesive may be useful for combining a panel with a hydroformed tube frame structure using self-positioning means to hold the parts in a correct alignment while the adhesive cures. In addition, the adhesive may be useful in bonding together members of a space frame. Furthermore, the adhesive may be used, for example, in an automobile to bond weld paddles onto an intrusion beam in order to make a door intrusion beam assembly. The adhesive may also be used to adhesively bond the door intrusion beam assembly in the automobile door. The adhesive may also be useful for bonding structural components of the automobile (e.g., bonding the strut tower to the frame rail). Welding (e.g., tack welding) or mechanical fastening could be used to fix the adhesively bonded paddles in place until the adhesive cures. It may also be desirable to use the adhesive to bond hydroformed tube steel together in order to make an automobile space frame assembly. Another use for the adhesives of the present disclosure involves hem bonding of two substrates with an appropriate mechanical structure. In hem bonding, an adhesive mass is formed between the edges of two substrates brought into close alignment. The edges of the substrates are bent in an overlapping fashion to form a folded or bent edge structure with the adhesive found between the substrates throughout the folded or overlapped edge. The thus formed edge structure can then be cured through induction heating or other common heat curing methods (e.g., infrared radiation, forced air, immerson, etc.).

In areas of adhesive bonding, the adhesive can be applied as a continuous bead, in intermediate dots, stripes, diagonals or any other geometrical form that will conform to forming a useful bond. Such adhesive placement options can be augmented by welding. The welding can occur as spot welds, as continuous seam welds, or as any other welding technology that can cooperate with an adhesive mass to form a mechanically sound joint that has adequate fatigue and impact resistance and load bearing performance. Such welding can occur around or through the adhesive bonds. The heat of welding can augment other curing energy inputs (e.g., oven baking, induction heating, etc.).

In order that this disclosure can be more fully understood, the following examples are set forth. It should be understood that these examples are for illustrative purposes only, and are not to be construed as limiting this disclosure in any manner.

EXAMPLES

The following abbreviations are used to describe the examples:
° C.: degrees Centigrade
° F.: degrees Fahrenheit
J: Joule
Kg: kilogram
KPa: kiloPascal
L: liter
lbs: pounds
mL: milliliter
mm: millimeter
mm/min: millimeter per minute
nm: nanometer
N/mm: Newtons per millimeter
rpm: revolutions per minute
Unless otherwise reported, all ratios are by dry weight.
Abbreviations for materials and reagents used in the examples are as follows:
AL-FLK: Aluminum flake, obtained under the trade designation "ALUMINUM NDT 62540/G", from Eckart America Corporation, Louisville, Ky.
AL-PWDR: Aluminum powder, obtained under the trade designation "ALUMINUM POWDER 120 ATOMIZED" from Eckart America Corporation.
BFLEX-131: isodecyl benzoate plasticizer, available under the trade designation "BENZOFLEX 131", from Genovique Specialties Corporation, Rosemont, Ill.
EPON-828: Diglycidyl ether of bisphenol A with an approximate epoxy equivalent weight of 187.5 grams/equivalent, obtained under the trade designation "EPON-828" from Hexion Specialty Chemicals, Houston, Tex.
GB-4: Glass beads, obtained under the trade designation "GLASS BEADS 0.010 IN CLASS 4" from Potters Industries, LLC, Malvern, Pa.
MISTRON: A high purity talc, obtained under the trade designation "MISTRON MONOMIX" from Imerys Performance & Filtration Minerals.
MX-154: A 40% core shell rubber in unmodified, liquid epoxy resin based on bisphenol-A, obtained under the trade designation "Kane Ace MX 154" from Kaneka Texas Corporation, Pasadena, Tex.
NYGLOS: A high aspect ratio wollastonite, obtained under the trade designation "NYGLOS-12" from Nyco Minerals, Inc., Willsboro, N.Y.

TTD: 4,7,10-trioxa-1,13-tridecane diamine, obtained from TCI America, Portland, Oreg.

TS-720: A treated fumed silica, available under the trade designation "CAB-O-SIL TS-720" from Cabot Corporation, Boston, Mass.

EH-30: A tertiary amine accelerator, obtained under the trade designation "VERSAMINE EH 30" from BASF Corporation, Florham Park, N.J.

Z-6040: 3-glycidoxypropyltrimethoxysilane, obtained from Dow Corning, Midland, Mich.

ADDUCT: Into a 40 gallon (151.4 L) Ross 3 shaft mixer kettle, 80 lbs (36.29 Kg) TTD diamine was added, followed by 46 lbs (20.87 Kg) MX-154 at a temperature of between 80-100° F. (26.7-37.7° C.), and mixed under nitrogen with the anchor blade at 35 rpms and shear blade at 700 rpms for 30 minutes. The mixture was then heated to 150° F. (65.6° C.), and the mixture allowed to reach its peak exotherm, approximately 190° F. (87.8° C.), after which the mixing continued for an additional 10 minutes. The mixture was cooled to 120° F. (48.9° C.) and an additional 27.6 lbs (12.52 Kg) of MX-154 at 80–100° F. (26.7-37.7° C.) was added and mixed under nitrogen for 30 minutes. The mixture was then heated to 150° F. (65.6° C.) and allowed to exotherm a second time, with an additional 10 minutes of mixing after the peak temperature of the exotherm was reached. The material was then transferred to sealed containers.

Illustrative Example A

Part A and compositions of a two-part structural adhesive listed in Table 1 were prepared as follows.

Part A

Except for approximately 40% by weight of the TS-720 fumed silica, all the components listed in Table 1 were added to a type "100 MAX DAC" speed mix cup at 21° C. and the mixture homogeneously dispersed for 1 minute at 1,500 rpm in a model "DAC 600 SPEED MIXER". The remaining TS-720 was then added and mixing continued for another minute at 1,500 rpm, followed by shear mixing for 10 minutes with a type "COWLES" blade at 1,000 rpm. The resultant Part A composition was then degassed by mixing for 10 minutes with a propeller blade mixer under a vacuum of 28 inches mercury (94.8 KPa).

TABLE 1

| Part A Composition | Parts by Weight | | |
|---|---|---|---|
| | Ill. Ex. A | Example 1 | Example 2 |
| ADDUCT | 31.68 | 31.68 | 31.68 |
| TTD | 6.84 | 6.84 | 6.84 |
| EH-30 | 1.48 | 1.48 | 1.48 |
| NYGLOS 12 | 3.50 | 3.50 | 3.50 |
| AL-FLK (as received) | 2.00 | 0 | 0 |
| AL-FLK (heated per Example 1) | 0 | 2.00 | 2.25 |
| AL-PWDR | 2.00 | 2.00 | 2.00 |
| TS-720 | 2.50 | 2.50 | 2.50 |
| GB-4 | 0 | 0.70 | 0.70 |

Part B

Part B of a two-part structural adhesive were prepared using the components shown in Table 2. All the components listed in Table 2 were added to a type "100 MAX DAC" speed mix cup at 21° C. and the mixture homogeneously dispersed for 2 minutes at 1,500 rpm in the "DAC 600 SPEED MIXER", followed by shear mixing for 10 minutes with the type "COWLES" blade at 1,000 rpm. The resultant Part B composition was then degassed by mixing for 10 minutes with a propeller blade mixer under a vacuum of 28 inches mercury (94.8 KPa).

TABLE 2

| Part B Composition | Parts by Weight | | |
|---|---|---|---|
| | Illustrative Example A | Example 1 | Example 2 |
| EPON 828 | 48.00 | 48.00 | 48.00 |
| MX-154 | 42.00 | 42.00 | 42.00 |
| Z-6040 | 2.00 | 2.00 | 2.00 |
| TS-720 | 1.50 | 1.50 | 1.50 |
| BFLEX-131 | 2.00 | 2.00 | 2.00 |
| MISTRON | 4.50 | 4.50 | 4.50 |

Examples 1 and 2

The Part A composition was prepared according to the process described in Illustrative Example A, except about 50 lbs (22.68 Kg) of the aluminum flake were subjected to four heating cycles of 16 hours in an oven having a temperature of approximately 220-250° F. (104.4-121.1° C.) in a covered, but not sealed, 10-gallon (37.85 L) drum. Between each heating cycle the aluminum flake was cooled to 21° C. and approximately 10 lbs (4.54 Kg) of the aluminum flake was removed. The aluminum flake used in Examples 1 and 2 was taken after the fourth heating cycle.

The Part A and corresponding Part B compositions were homogeneously mixed in the following ratios by weight and evaluated for Impact Peel Strength, T-Peel Strength, and Lap Shear strength. Results are listed in Table 3.

Ill. Ex. A: 10.00/18.50
Example 1: 10.14/18.50
Example 2: 10.19/18.50

Evaluations

A curable composition was prepared by homogeneously mixing the Part A and Part B compositions in the weight ratios shown above at 21° C. by means of a speed mixer, 1500 rpm for 1 minute, followed by gentle manually mixing using a wood tongue depressor. In cases where glass beads were not included in the formulation, beads were added to the bonds prior to assembling the bonds.

Impact Peel Strength

Impact Peel Strength was determined according to ISO 11343 as follows. The curable composition was applied to unpolished test coupons, type "E60 EZG 60G 2S", from ACT Test Panels LLC, Hillsdale, Mich., having dimensions 0.787×3.54×0.030 inches (20.0×90.0×0.76 mm). The coupons were degreased by cleaning twice with "GENERAL PURPOSE ADHESIVE CLEANER, 08987", then abraded with a grade "80+ CUBITRON II ROLOC" grinding disc, both obtained from 3M Company, to remove the electrogalvanized coating on the bonding surface. A thin layer of adhesive sample was applied to both coupons over the 30 mm×20 mm bond area with a small bonding bead applied to one lap prior to clamping the laps together with ¾-inch (19.05 mm) binder clips. Excess adhesive was removed with a metal spatula. The resulting assembly was cured at 21° C. for at least 7 days prior to testing at an impact velocity of 2 m/s at −20° C., and/or 23° C., with a minimum conditioning time of 1 hour at the test temperature on a model "9250 INSTRON DYNATUP". The area under the measurement curve (from 25% to 90%, according to the ISO 11343) is given as the fracture energy, in joules. The impact peel strength values are reported as impact strength, in N/mm. Results listed in Table 3 represent an average of at least 2 coupons per Illustrative Example and Example.

T-Peel Strength

T-Peel Strength was determined according to ASTM D1876 as follows. The curable composition was applied to 4×1×0.033 inch (101.6×25.4×0.84 mm) 1018 cold rolled steel coupons bent at a 90° angle 1-inch (25.4 mm) from the end and degreased and abraded according to the method used for Impact Peel testing. A thin layer of adhesive was applied to both coupons over a 75 mm×25 mm bond area with a small bonding bead applied to one lap prior to clamping the laps together with two 1¼ inch (31.75 mm) binder clips on each side. Excess adhesive was then removed with a metal spatula. The resulting assembly was cured at 21° C. for at least 4 days prior to testing with a pull rate of 50 mm/min on a model "QTEST 100" Universal Test Frame from MTS Systems Corporation, Evansville, Ill. The average peel force was measured and the average reported over the pull range of 2 to 5 inches in N/25 mm. Results listed in Table 3 represent an average of at least 3 coupons per Illustrative Example and Example.

Lap Shear Strength

Lap Shear was determined according to ASTM D1002 as follows. 4×1×0.033 inch (101.6×25.4×0.84 mm) 1018 cold rolled steel coupons were degreased and abraded as described in the T-Peel test. A thin layer of adhesive was applied to both coupons over a 12.5 mm×25 mm bond area with a small bonding bead applied to one lap prior to clamping the laps together with ¾ inch binder clips on each side. Excess adhesive was then removed with a metal spatula. The resulting assembly was cured at 21° C. for at least 4 days prior to testing with a pull rate of 10 mm/min on the QTEST 100. The failure load was recorded. The quoted lap shear strengths were calculated as failure load/(width of the bond×length of the bond). Results listed in Table 3 represent an average of at least 3 coupons per Illustrative Example and Example.

the aluminum flakes having been heated after milling at a temperature of at least 75° C.

2. The curable adhesive composition of claim 1, wherein the curable epoxy resin comprises a bisphenol epoxy resin, a novolac epoxy resin, or a combination thereof.

3. The curable adhesive composition of claim 1, wherein the toughening agent comprises at least one of a core/shell polymer, an acrylic polymer, a butadiene nitrile rubber, or a polyurethane.

4. The curable adhesive composition of claim 1, wherein the amine curing agent comprises at least one of an aliphatic diamine, aromatic diamine, an arylalkylene diamine, a polyether diamine, or a combination thereof.

5. The curable adhesive composition of claim 1, wherein the curable epoxy resin has two or more epoxy groups and the amine curing agent has two or more amine hydrogens and the molar ratio of epoxy groups on the curable epoxy resin to amine hydrogens on the amine curing agent ranges from about 0.5:1 to about 3:1.

6. The curable adhesive composition of claim 1, wherein the curable adhesive composition is curable at room temperature.

7. The curable adhesive composition of claim 1, wherein the aluminum flakes have been heated after milling in an environment set at a temperature in a range from 100° C. to 150° C. for a time sufficient to physically or chemically modify the aluminum flakes comprising the fatty acid milling aid on at least a portion of their surfaces.

8. The curable adhesive composition of claim 1, wherein the fatty acid milling aid comprises stearic acid.

9. The curable adhesive composition of claim 1, wherein the aluminum flakes are dry-milled.

10. The curable adhesive composition of claim 1, wherein the curable adhesive composition provides upon curing an adhesive bond with at least one of an improved T-Peel strength or an improved Impact Peel Strength relative to a comparative adhesive composition, wherein the comparative adhesive composition is the same as the curable adhesive composition except that the aluminum flakes are not heated after milling.

TABLE 3

| | Impact Peel Strength | | | | | T-Peel Strength | | Lap Shear Strength | |
| --- | --- | --- | --- | --- | --- | --- | --- | --- | --- |
| | @ −20° C. | | | @ 23° C. | | | @ 23° C. | | @ 23° C. |
| Sample | (N/mm) | Fracture Energy (J) | Cohesive Failure (%) | (N/mm) | Fracture Energy (J) | Cohesive Failure (%) | (N/25 mm) | Cohesive Failure (%) | MPa | Cohesive Failure % |
| Ill. Ex. A | 7.3 | 2.8 | 95 | 14.5 | 6.3 | 95 | 215 | 97 | 21.2 | 82 |
| Ex. 1 | 11.3 | 4.6 | 95 | 20.7 | 9.2 | 95 | 254 | 93 | 21.5 | 95 |
| Ex. 2 | 13.2 | 5.5 | 95 | 22.8 | 10.1 | 95 | 229 | 92 | N/D | N/D |

In Table 3, N/D means not determined.

This disclosure may take on various modifications and alterations without departing from its spirit and scope. Accordingly, this disclosure is not limited to the above-described embodiments but is to be controlled by the limitations set forth in the following claims and any equivalents thereof. This disclosure may be suitably practiced in the absence of any element not specifically disclosed herein.

What is claimed is:

1. A curable adhesive composition comprising a curable epoxy resin, an amine curing agent, a toughening agent, and aluminum flakes, wherein the aluminum flakes comprise a fatty acid milling aid on at least a portion of their surfaces, 11. The curable adhesive composition of claim 1, packaged as a two-part adhesive, wherein a first part comprises the amine curing agent, a second part comprises the curable epoxy resin, at least one of the first part or the second part comprises the toughening agent, and at least one of the first part or the second part comprises the aluminum flakes.

12. The curable adhesive composition of claim 11, packaged in an adhesive dispenser comprising a first chamber and a second chamber, wherein the first chamber comprises the first part, and wherein the second chamber comprises the second part.

13. A method of forming an adhesive bond between members, the method comprising:

applying the curable adhesive composition of claim 1 to a surface of at least one of two or more members;

joining the members so that the curable adhesive composition is sandwiched between the two or more members; and curing the curable adhesive composition to form an adhesive bond between the two or more members.

14. The method of claim 13, wherein at least one of the two or more members comprises at least a portion of a vehicle.

15. The method of claim 13, wherein at least one of a T-Peel strength or an Impact Peel Strength of the adhesive bond is improved relative to a comparative method which is the same as the method of claim 13 except that a comparative adhesive composition is used instead of the curable adhesive composition, wherein the comparative adhesive composition is the same as the curable adhesive composition except that the aluminum flakes are not heated after milling.

16. The method of claim 13, wherein curing is carried out at room temperature.

17. The method of claim 13, wherein the curable adhesive composition is a two-part adhesive, wherein a first part comprises the amine curing agent, a second part comprises the curable epoxy resin, at least one of the first part or the second part comprises the toughening agent, and at least one of the first part or the second part comprises the aluminum flakes, wherein applying comprises dispensing the curable adhesive composition from an adhesive dispenser comprising a first chamber, a second chamber, and a mixing tip, wherein the first chamber comprises the first part, wherein the second chamber comprises the second part, and wherein the first and second chambers are coupled to the mixing tip to allow the first part and the second part to flow through the mixing tip.

18. An article comprising a cured adhesive composition sandwiched between at least two members, wherein the cured adhesive composition is prepared by curing the curable adhesive composition of claim 1.

19. The article of claim 18, wherein the cured adhesive composition provides at least one of an improved T-Peel strength or an improved Impact Peel Strength relative to a comparative cured adhesive composition, wherein the comparative cured adhesive composition is the same as the cured adhesive composition except that the aluminum flakes are not heated after milling.

20. The article of claim 18, wherein the article is a portion of a vehicle.

* * * * *

UNITED STATES PATENT AND TRADEMARK OFFICE
CERTIFICATE OF CORRECTION

Page 1 of 1

PATENT NO. : 10,683,441 B2
APPLICATION NO. : 15/448277
DATED : June 16, 2020
INVENTOR(S) : Jay Schlechte et al.

It is certified that error appears in the above-identified patent and that said Letters Patent is hereby corrected as shown below:

In the Specification

Column 4
Line 18, delete "IV" and insert -- $R^1$ --, therefor.

Column 7
Line 1, delete "alkylene-arylalkylene," and insert -- alkylene-aryl-alkylene, --, therefor.

Column 12
Line 41, delete "L-1[$R^2Si(Y)_3$]$_k$." and insert -- L-[$R^2Si(Y)_3$]$_k$. --, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*